(12) United States Patent
Madden

(10) Patent No.: US 7,721,208 B2
(45) Date of Patent: May 18, 2010

(54) MULTI-MEDIA CENTER FOR COMPUTING SYSTEMS

(75) Inventor: Thomas Madden, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 524 days.

(21) Appl. No.: 11/247,975

(22) Filed: Oct. 10, 2005

(65) Prior Publication Data

US 2007/0083616 A1 Apr. 12, 2007

Related U.S. Application Data

(60) Provisional application No. 60/724,622, filed on Oct. 7, 2005.

(51) Int. Cl.
*G06F 3/00* (2006.01)
(52) U.S. Cl. .................. 715/716; 715/717; 715/718; 715/810; 715/828
(58) Field of Classification Search ............... 715/716, 715/717, 718, 810, 828
See application file for complete search history.

(56) References Cited

U.S. PATENT DOCUMENTS

| | | | |
|---|---|---|---|
| 4,847,781 | A | 7/1989 | Brown et al. |
| 6,064,380 | A | 5/2000 | Swenson et al. |
| 6,654,030 | B1 | 11/2003 | Hui |
| 6,889,001 | B1 | 5/2005 | Nikaido et al. |
| 6,914,551 | B2 | 7/2005 | Vidal |
| 6,990,671 | B1 | 1/2006 | Evans et al. |
| 7,205,471 | B2 * | 4/2007 | Looney et al. .......... 84/615 |
| 2002/0091662 | A1 * | 7/2002 | Bogia .................. 707/1 |
| 2004/0047588 | A1 | 3/2004 | Okada et al. |
| 2004/0162845 | A1 * | 8/2004 | Kim et al. ............ 707/102 |
| 2005/0027539 | A1 * | 2/2005 | Weber et al. ........... 704/275 |
| 2005/0132055 | A1 * | 6/2005 | Neogi ................. 709/227 |
| 2005/0138664 | A1 * | 6/2005 | Neogi .................. 725/80 |
| 2005/0155077 | A1 * | 7/2005 | Lawrence et al. ...... 725/109 |
| 2005/0198574 | A1 | 9/2005 | Lamkin et al. |
| 2006/0036959 | A1 * | 2/2006 | Heatherly et al. ...... 715/764 |
| 2006/0064720 | A1 * | 3/2006 | Istvan et al. ............ 725/38 |
| 2006/0143327 | A1 * | 6/2006 | Hsieh et al. ............ 710/18 |
| 2006/0206428 | A1 | 9/2006 | Vidos |
| 2006/0206799 | A1 | 9/2006 | Wehn |

(Continued)

OTHER PUBLICATIONS

Microsft, Windows XP Media Center Edition, First released: Jan. 2002—Last released: Nov. 2004, an article summarizing the program is provided in lieu of the actual software itself.*

(Continued)

*Primary Examiner*—Weilun Lo
*Assistant Examiner*—Tuyetlien T Tran

(57) ABSTRACT

Various "media-components" are provided in a "multi-media center." In modular architecture, a module-controller communicates with media-modules provided for various media-components. A media-module can include or obtain data pertaining to a particular media-component, identify media-player(s), and access information related to their media. However, the media-modules are isolated from each other, and the module-controller effectively controls output generated in response to user input. A user interface library is provided for the media-modules. Media-modules can obtain a template or other tools from the library and construct their user interface (e.g., menus). Media-modules can also identify a media-player that can be initiated in response to user input. Subsequently, the media-controller forwards user input to the media-player.

23 Claims, 6 Drawing Sheets

U.S. PATENT DOCUMENTS

| | | | |
|---|---|---|---|
| 2007/0016860 A1* | 1/2007 | Lim | 715/700 |
| 2007/0028267 A1* | 2/2007 | Ostojic et al. | 725/52 |
| 2007/0080823 A1 | 4/2007 | Fu et al. | |
| 2007/0083911 A1 | 4/2007 | Madden et al. | |
| 2007/0169115 A1 | 7/2007 | Ko et al. | |
| 2007/0189737 A1 | 8/2007 | Chaudhri et al. | |

OTHER PUBLICATIONS

"Application software," Wikipedia, the free encyclopedia, http://en.wikipedia.org/wiki/Application_software, 3 pages.

"Digital audio," Wikipedia, the free encyclopedia, http://en.wikipedia.org/wiki/Digital_audio, 3 pages.

"Digital Media," Wikipedia, the free encyclopedia, http://en.wikipedia.org/wiki/Digital_Media, 2 pages.

"Digital video," Wikipedia, the free encyclopedia, http://en.wikipedia.org/wiki/Digital_video, 3 pages.

"ITunes," Wikipedia, the free encyclopedia, http://en.wikipedia.org/wiki/ITunes, 11 pages.

"Media player," Wikipedia, the free encyclopedia, http://en.wikipedia.org/wiki/Media_player, 1 page.

"Multimedia," Wikipedia, the free encyclopedia, http://en.wikipedia.org/wiki/Multimedia, 2 pages.

"Windows XP Media Center Edition", http://en.wikipedia.org/wiki/Windows_XP_Media_Center_Edition, downloaded Sep. 27, 2005, pp. 1-5.

Microsoft Windows XP for Home Users Service Pack 2 Edition, Jul. 7, 2005, Peachpit Press, 13 pages.

Ralph LaBarge, DVD Authoring & Production, 2001, Focal Press, pp. 113 and 252.

Sailing Clicker 2.2.1, User Manual, Salling Software AB, 2005.

Remote for iTunes (URM-15T), product information datasheet, Keyspan, http://www.keyspan.com/products/usb/urm15t, dowloaded Sep. 25, 2005. pp. 1-2.

Express Remote (URM-17A), product information datasheet, Keyspan, http://www.keyspan.com/products/usb/urm15t, downloaded Sep. 25, 2005. pp. 1-2.

"Keyspan Express Remote Supports Apple's Airport Express," Press Relase, Keyspan, Nov. 10, 2004.

"Keyspan Express Remote", Product Fact Sheet, Keyspan, published Sep. 25, 2005.

Keyspan: DMR Software v. 1.3 for Mac OS.X User Manuar rev. 04.09.01A, published 1998.

* cited by examiner

MULTI-MEDIA CENTER FOR COMPUTING SYSTEMS

CROSS-REFERENCE TO RELATED APPLICATIONS

This application claims priority to U.S. Provisional Patent Application No. 60/724,622, filed Oct. 7, 2005, and entitled "MULTIMEDIA SYSTEM," which is hereby incorporated herein by reference.

This application is related to: (i) U.S. patent application Ser. No. 11/245,937, filed Oct. 7, 2005, and entitled "TECHNIQUES FOR PAIRING REMOTE CONTROLLERS WITH HOST DEVICES", which is hereby incorporated by reference herein; and (ii) U.S. Provisional Patent Application No. 60/725,544, filed Oct. 10, 2005, and entitled "MULTI-MEDIA CONTROL CENTER", which is hereby incorporated by reference herein.

BACKGROUND OF THE INVENTION

Today, virtually anything can be represented as digital data and presented in numerous forms including audible, visual, or audio-visual forms. Digital data can also be transported electronically, for example, as digital files or digital streams. Basically speaking, digital data can be stored as a "digital media" (e.g., a digital file, a media-player which stores digital data). Digital media (or "media") can be accessed by a variety of computing devices (e.g., personal computers, media-players, personal assistants, wireless phones). Typically, digital media includes at least digital content (or "content") that represents the actual content of information stored in a digital form. As such, digital content can, for example, be the content of a printed book, a picture, a song in audible form and/or in audio-visual forms (e.g., a rock video), movies, sports broadcasts, news in a variety of forms including text, audio, or audio-visual.

Digital media can be packaged with media-player(s) and/or other application programs. For example, Apple iPod media-player available from Apple Computers, Inc. combines a digital audio player and a portable hard drive for storing the media. iTunes or iPhoto, which are also available from Apple Computers, Inc, can be packaged with media-players and applications or tools that can be used for organization, searching and retrieval of media (e.g., organizing photo, obtaining lists of music or films from a database, and downloading music or films). Packaging digital media with media-players, tools, or other applications is a relatively recent development. Nevertheless, given the popularity of digital media, numerous forms of media and media-players have been developed and are in use today.

As digital data has become more prevalent, techniques for presenting digital data have become increasingly more useful.

SUMMARY OF THE INVENTION

Broadly speaking, the invention pertains to techniques for combining various "media-components." In accordance with one aspect of the invention, various "media-components" are provided in a "multi-media center" which can be accessed via a central-user-interface. A "media-component" as used herein refers to a computer readable medium that includes digital data and/or an application that can access digital data. As such, a media-component can include one or more media-players and/or other applications (or tools). The "multi-media center" can, for example, be provided as a program on a computer system that includes one or more computers. The central-user-interface can graphically represent each media-component (e.g., as a selectable item in a main menu). User input can be entered, for example, by a keyboard and/or mouse connected to a computer system, or it can be entered remotely (e.g., wirelessly and/or over a network).

Another aspect of the invention provides a modular architecture that includes at least one media-module for each of the media-components configured for the multi-media-player. A media-module can include or obtain data pertaining to a particular media-component (e.g., user interface menus, lists of digital data in the media-component). In addition, a media-module can also identify media-player(s) and access information related to their media (e.g., music or movie lists). However, the media-modules do not directly control output. Instead, a module-controller communicates with various media-modules and effectively controls output generated in response to user input. The module-controller can forward the input to various media-modules for processing and receive output from them. Subsequently, the module-controller can use the output generated by the media-modules to perform the appropriate response (e.g., manipulate display of menus or presentation of media). In other words, the media-modules do not directly control the output of the multi-media center even though they may process the input and effectively generate the appropriate response. Furthermore, media-modules can be isolated from each other. As a result, the media-modules cannot communicate with each other, but can be added or removed dynamically as they do not affect each other or a main (base) program that effectively runs the multi-media center.

In one embodiment, each media-module includes or can obtain information needed to construct menus for its associated media-component. It should be noted that media-modules can construct their menus (or submenus) by using an User Interface Library (or library). More particularly, media-modules can obtain a template or other tools (e.g., metric utilities, windows, views, widgets, sounds) from the User Interface Library (or library). As such, each media-module may select a user interface template (e.g., menus, window) from the User Interface Library (or library) and subsequently fill (or populate it) with the appropriate information (e.g., menu items). In addition, the media-module can identify media-player(s) that can be used to present their media, and access information related to their media (e.g., music or movie list). The module-controller, however, initiates the media-player associated with a media-component and subsequently forwards any input associated with presentation of media directly to the media-player for processing. As a result, the familiar look and feel of media-players can be preserved.

The invention can be implemented in numerous ways, including a method, an apparatus, a computer readable medium, or a computer system. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
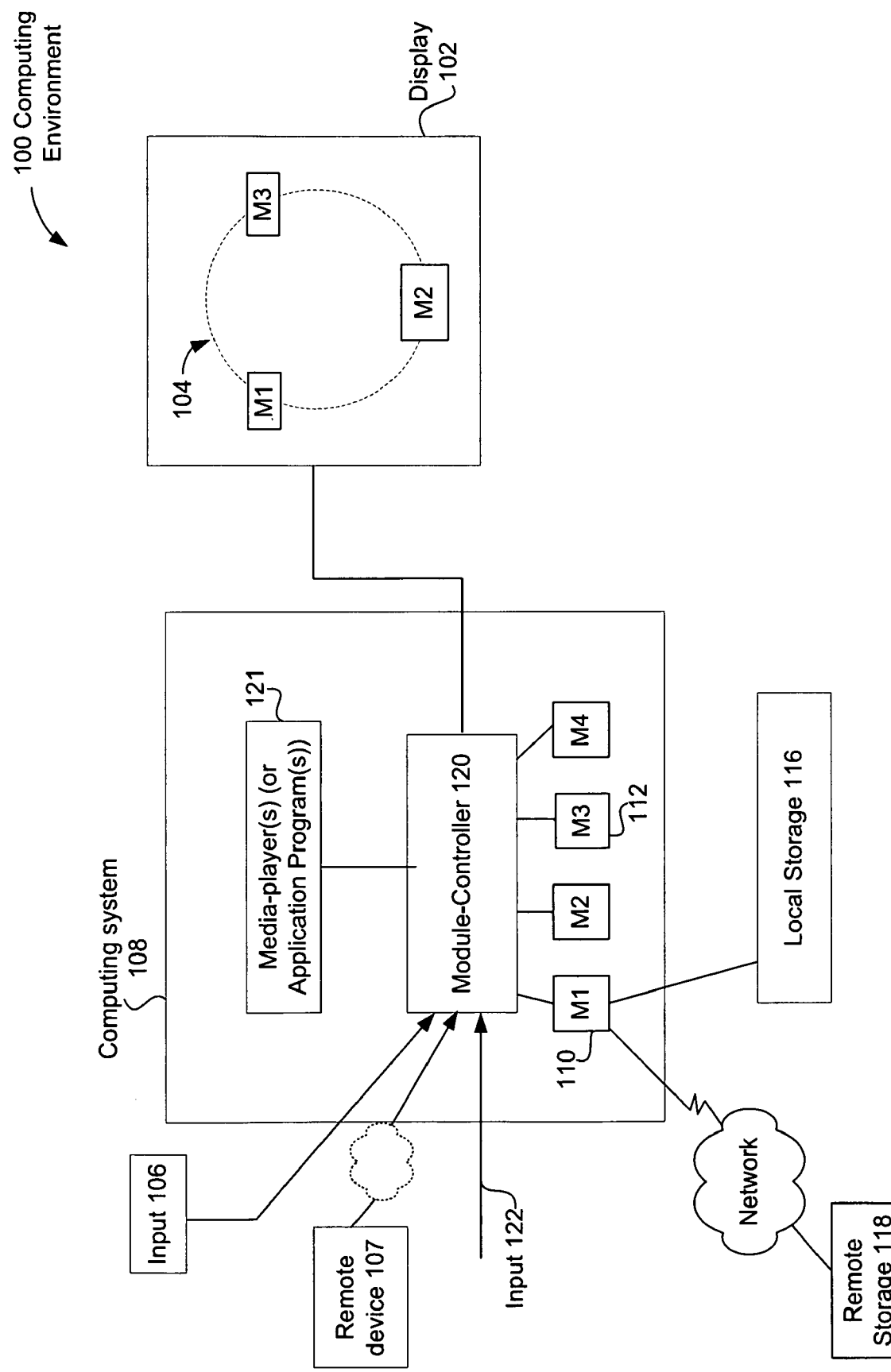
FIG. 1 depicts a computing environment capable of providing a multi-media-center in accordance of one embodiment of the invention.

As noted in the background section, techniques for presenting digital data have become increasingly more useful as digital media and media-players have become increasingly more popular and prevalent. Furthermore, given that many different forms of digital media and media-players have been developed and even more are likely to be developed soon, it is highly desirable to provide a "multi-media center" that can effectively combine various "media-components."

Accordingly, the invention pertains to techniques for combining various "media-components." In accordance with one aspect of the invention, various "media-components" are provided in a "multi-media center" which can be accessed via a central-user-interface. A "media-component" as used herein refers to digital media and/or application(s) used to access digital media. The "multi-media center" can, for example, be provided as a program on a computer system that includes one or more computers. The central-user-interface can graphically represent each media-component (e.g., as a selectable item in a main menu). User input can be entered, for example, by a keyboard and/or mouse connected to a computer system, or it can be entered remotely (e.g., wirelessly and/or over a network).

Another aspect of the invention provides a modular architecture that includes at least one media-module for each of the media-components configured for the multi-media-player. A media-module can include or obtain data pertaining to a particular media-component (e.g., user interface menus, lists of digital data in the media-component). In addition, a media-module can also identify media-player(s) and access information related to their media (e.g., music or movie lists). However, the media-modules do not directly control output. Instead, a module-controller communicates with various media-modules and effectively controls output generated in response to user input. The module-controller can forward the input to various media-modules for processing and receive output from them. Subsequently, the module-controller can use the output generated by the media-modules to perform the appropriate response (e.g., manipulate display of menus or presentation of media). In other words, the media-modules do not directly control the output of the multi-media center even though they may process the input and effectively generate the appropriate response. Furthermore, media-modules can be isolated from each other. As a result, the media-modules cannot communicate with each other, but can be added or removed dynamically as they do not affect each other or a main (base) program that effectively runs the multi-media center.

In one embodiment, each media-module includes or can obtain information needed to construct menus for its associated media-component. It should be noted that media-modules can construct their menus (or submenus) by using an User Interface Library (or library). More particularly, media-modules can obtain a template or other tools (e.g., metric utilities, windows, views, widgets, sounds) from the User Interface Library (or library). As such, each media-module may select a user interface template (e.g., menus, window) from the User Interface Library (or library) and subsequently fill (or populate it) with the appropriate information (e.g., menu items). In addition, the media-module can identify media-player(s) that can be used to present digital data associated with a media-component, and access information related to their media (e.g., music or movie list). However, the module-controller initiates the media-player associated with a media-component and subsequently forwards any input associated with presentation of media directly to the media-player for processing. As a result, the familiar look and feel of media-players can be preserved.

Embodiments of these aspects of the invention are discussed below with reference to FIGS. 1-4B. However, those skilled in the art will readily appreciate that the detailed description given herein with respect to these figures is for explanatory purposes as the invention extends beyond these limited embodiments.

FIG. 1 depicts a computing environment 100 capable of providing a multi-media-center in accordance with one embodiment of the invention. It will be appreciated that the multi-media-center can combine a plurality of media-components each including digital data and/or application(s) that can access digital data. The digital data associated with a media-component can be presented in one or more forms (e.g., display pictures, play music while displaying pictures, play a movie or a song). These media-components can be readily available and/or generally known (e.g., music player (e.g., iTunes), photo viewer (e.g., iPhoto), DVD player) or they can be developed for the multi-media-center. In general, each media-component includes digital data which can be presented in one or more forms and/or one or more application(s) (e.g., media-player) that can be used to manipulate digital data (e.g., present, organize, retrieve).

It will be appreciated that the computing environment 100 can provide a "central-user-interface" that can serve as a user interface for accessing all the media-components provided in the multi-media center. Referring now to FIG. 1, a main menu 104 displayed on a display 102 can be part of the central-user-interface for a multi-media center provided by the computing system 108. Furthermore, user input may be entered via an input device 106 (e.g., keyboard, mouse) connected to a computing system 108, and/or via a remote device 107 (e.g., remote controller, media-player with remote control capabilities) whether directly or via a network. The computing system 108 can, for example, be a computer, or a plurality of computers (e.g., a cluster). In general, the computing system 108 includes at least one processor and memory (not shown).

As depicted in FIG. 1, the main menu 104 can, for example, include a main menu-items ($M_1 \ldots M_n$) for each of the media-components provided by the multi-media center. Thus, a menu item $M_i$ in the main menu 104 can represent a media-component $M_i$. In addition, for each of the media-components ($M_1$-$M_n$) provided by the multi-media center, a media-module is configured in the computing system 108. This means that a media-module 110 is provided for media-component M represented in the main menu 104 ($M_1$) and available for access. Generally, the media-module 110 (M) can include the information needed to construct and display various menus (or submenus) for the media-component $M_i$. As such, if the media-component M is selected from the main menu, media-module 110 can provide a main (or base) menu for the media-component M. Similarly, the media-module 110 ($M_i$) can provide submenus for the media-component $M_i$ if its submenu is selected, and so on. It should be noted that the media-module 110 can obtain data from a local storage 116 or a remote storage 118 (e.g., database). Typically, the data pertains to the media-component M.

It will be appreciated that the modular design of the architecture demonstrated in FIG. 1 allows configuring a plurality of media-modules for various media-components. The media-module can provide a set of self-contained menus for a media-component. In addition, media-modules can be isolated from each other, so that they can be added or removed from the multi-media center without interfering with each other or a main program that controls the multi-media center.

In this modular design, the media-modules communicate with a multi-media-controller (or module-controller) 120. The multi-media-controller 120 can effectively control the centralized user interface (e.g., the menu displayed on display 102). The multi-media-controller (or module-controller) 120 can also serve as a central point for receiving input associated with the multi-media center (e.g., input received from the input 106, or remote device 107). More particularly, the multi-media-controller 120 can forward an input 122 to one of the media-modules ($M_1 \ldots M_n$), or to a media-player (or other applications) 112 that process the input in response to input 122. The media-modules ($M_1 \ldots M_n$) can generate output (e.g., menu, submenu, request to activate a media-player). As will be discussed in greater detail below, in some cases, the multi-media-controller 120 processes input 122 without forwarding it to a media-module or media-player(s) 121.

From an architectural perspective, it is important to note that the media-modules ($M_1 \ldots M_n$) do not directly control output (e.g., what is displayed on the display 102), but communicate with the multi-media-controller 120 which effectively controls output. However, output can be determined based on the processing or output provided or generated of the media-module. Typically, input is initially processed at a central location, namely, the multi-media-controller 120 which can route the input to the appropriate destination. Finally, media-modules ($M_1 \ldots M_n$) are typically isolated from each other and do not communicate with each other. Generally, the multi-media-controller 120 routes input to a media-module ($M_i$) if it can be handled by the media-module (e.g., input concerns a menu or additional information relating to a media-component). However, if a media-player (or other application) is to be activated or is currently presenting media, then the module-controller typically forwards the input to the media-player to affect the presentation of the media (or processing of media by an application program).

Figure 2A:
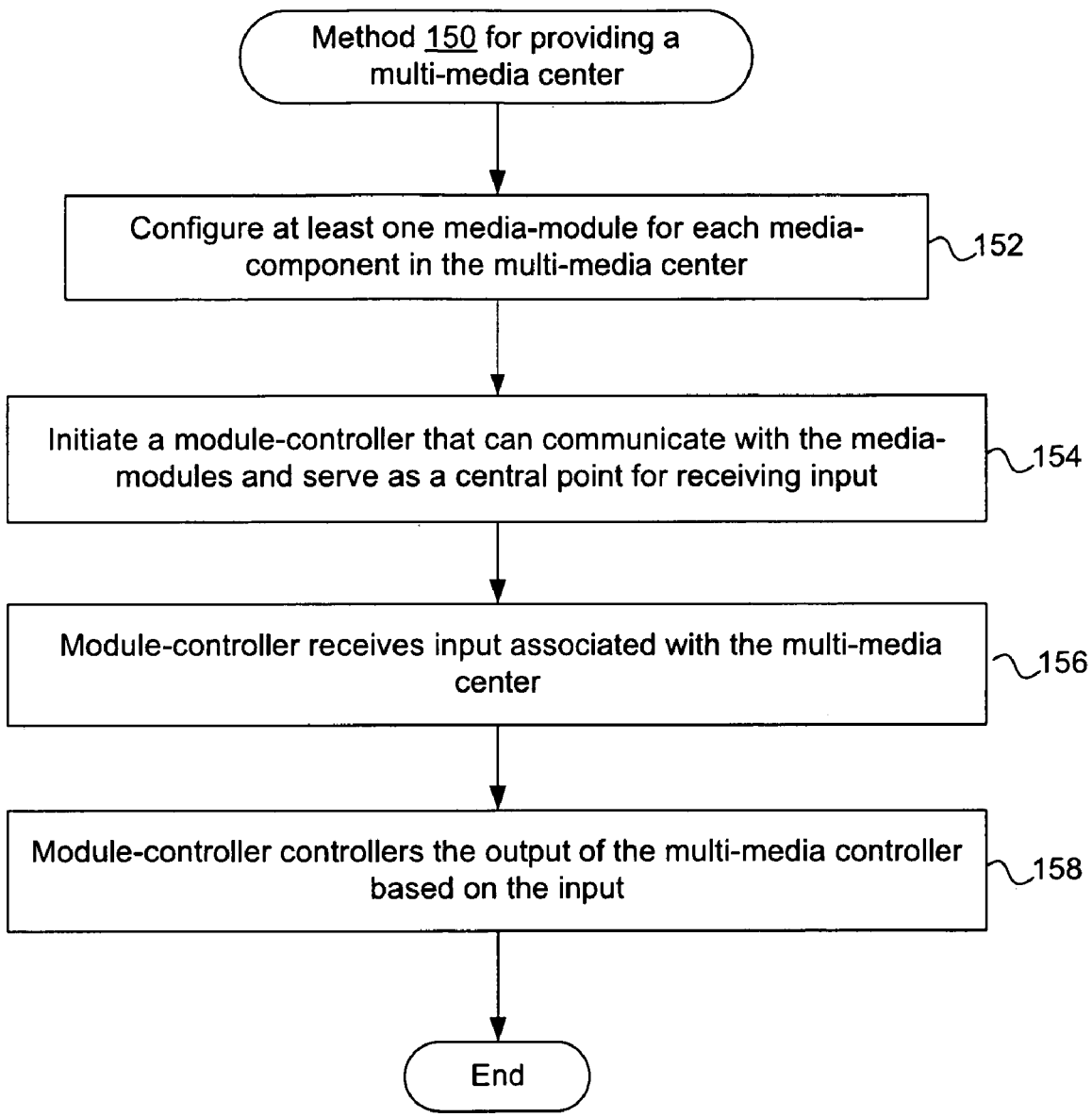
FIG. 2A depicts a method for providing a multi-media center in accordance with one embodiment of the invention.

FIG. 2A depicts a method 150 for providing a multi-media center in accordance with one embodiment of the invention. Initially, at least one media-module is configured (152) for each media-component provided by the multi-media center. A media-module represents a media-component and can, among other things, include and/or obtain information relating to a media-component (e.g., menus, lists of available items) and/or applications (e.g., media-players) related to the media-component.

Next, a central entity (e.g., a module-controller) is initiated (154) for the media-modules. The central entity (e.g., module-controller), among other things, can communicate with the media-modules and exchange information, for example, as input/output. In addition, the central entity (e.g., module-controller) can serve as a central point for receiving input. Accordingly, the central entity (e.g., module-controller) receives (156) input associated with the multi-media-controller. Finally, the central entity (e.g., module-controller) effectively controls (158) the output of the multi-media center based on the input. As will be discussed below, a central entity (e.g., module-controller) can effectively control the output of the multi-media cent, for example, by forwarding the input to a media-module and subsequently receiving output, by forwarding the input to an application program associated with the media-module and the media-component, or by effectively processing it internally or by an associated component (e.g., a main view media-module provided to control the main-view for the multi-media center).

Figure 2B:
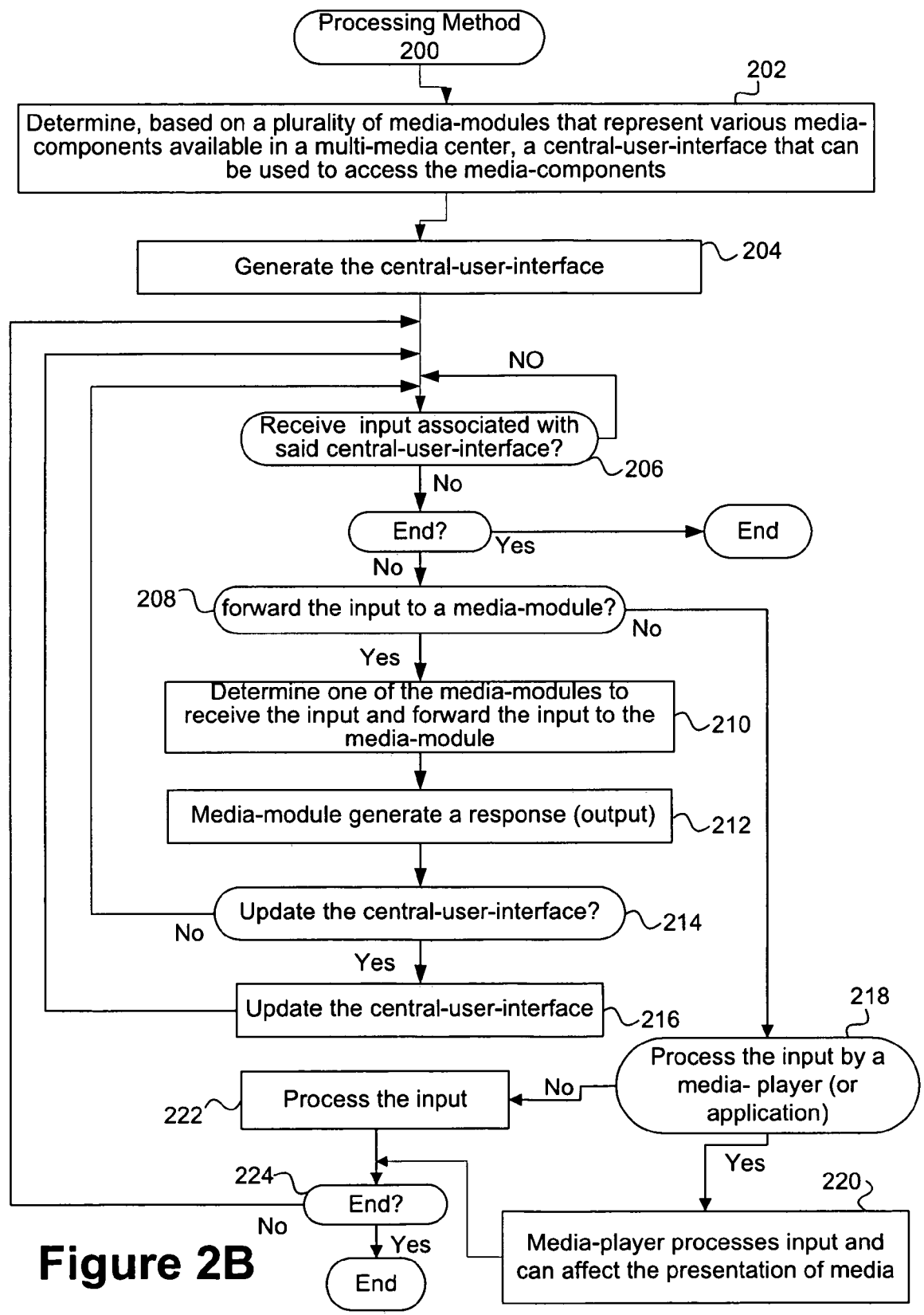
FIG. 2B depicts a method for processing input associated with a multi-media center in accordance with one embodiment of the invention.

To further elaborate, FIG. 2B depicts a method 200 for processing input associated with a multi-media center in accordance with one embodiment of the invention. The processing method 200 can, for example, be used by the multi-media-controller (or module-controller) 120 shown in FIG. 1. The multi-media center can, for example, be implemented as computer program. Initially, a central-user-interface that can be used to access a plurality of media-components is determined (202). It should be noted that the central-user-interface is determined based on a plurality of media-modules that represent various media-components configured (i.e., available) in the multi-media center. Accordingly, the central-user-interface is generated (204) based on the media-modules. Next, it is determined (206) whether input associated with the central-user-interface is received. If it is determined (206) that input is received and the input does not indicate to end the multi-media center, it is determined (208) whether to forward the input to one of the media-modules configured for the multi-media center. If it is determined (208) to forward the input to one of the media-modules, a media-module that is to receive the input is determined and the input is forwarded (210) to the media-module. Thereafter, a response (e.g., output) is generated by the media-module (212). After the processing of the input by the media-module, it is determined (214) whether to update the central-user-interface based on the response generated by the media-module. Accordingly, the central-user-interface can be updated (216). Subsequently, it can be determined (206) whether input associated with the central-user-interface is received and the processing method 200 can proceed in a similar manner as discussed above. However, if it is determined (214) not to update the central-user-interface, it is determined (206) whether input associated with the central-user-interface is received without updating (216) the central-user-interface. Thereafter, the method 200 proceeds in a similar manner as discussed above.

On the other hand, if it is determined (208) not to process the input by a media-module, it is determined (218) whether to process the input by a media-player (or an application). Accordingly, the input can be processed (220) by the media-player and the media-player may affect the presentation of media based on the input. Thereafter, it is determined (222) whether to end the multi-media center and the method 200 can end. Otherwise, it can be determined (206) whether input associated with the central-user-interface is received and the method 200 proceeds in a similar manner as discussed above.

If it is determined (218) not to process the input by a media-player (or application), the input is processed (222) internally (e.g., by a media-controller) or another component of the multi-media center (e.g., by a main window component that processes input associated with a main menu of the multi-media center). Subsequently, it is determined (224) whether to end the multi-media center (e.g., terminate the computer program) and the method 200 can end accordingly. Otherwise, it is determined (206) whether input associated with the multi-media center is received and the method 200 proceeds as discussed above until an input indicates to end the multi-media center.

Figure 3:
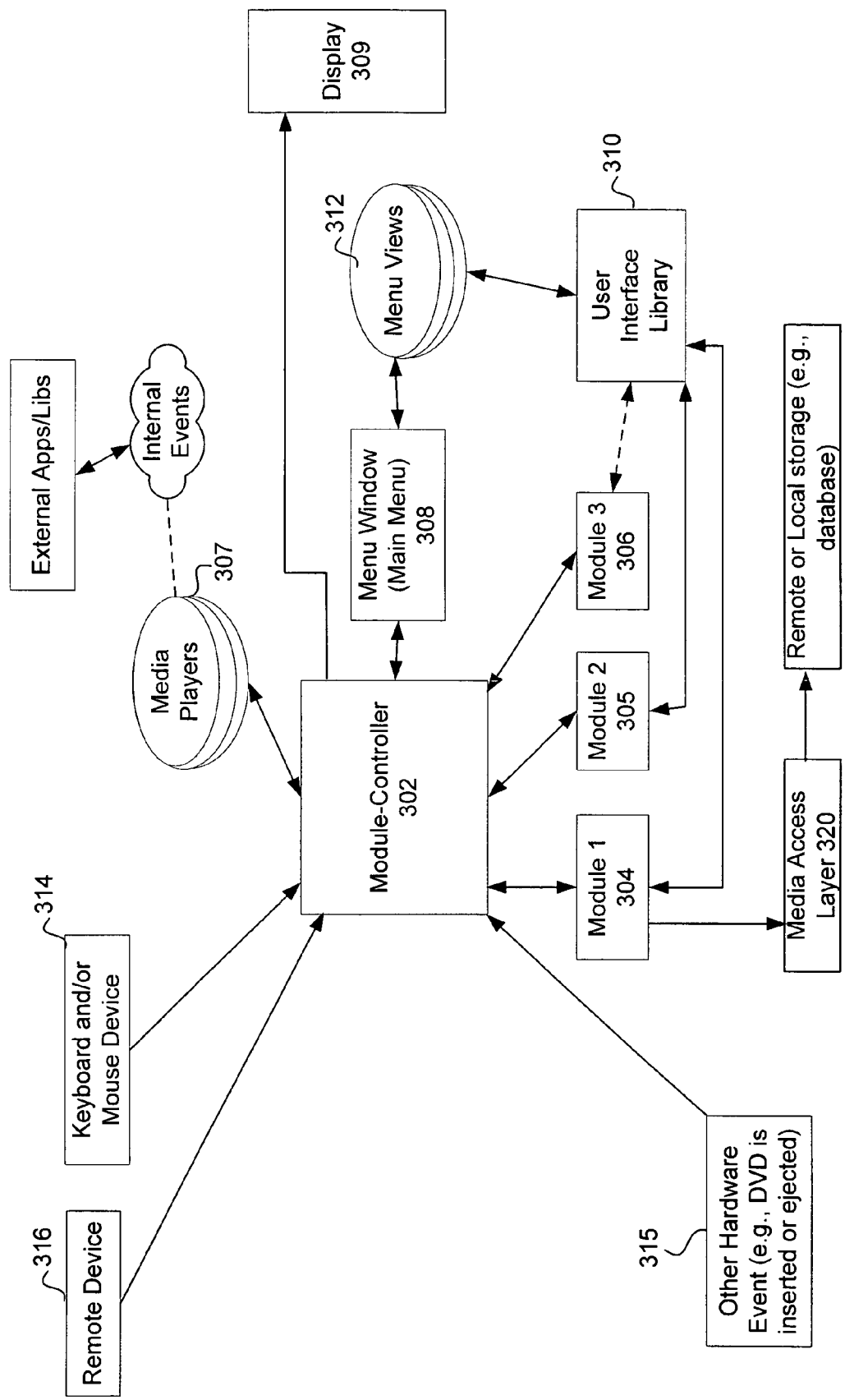
FIG. 3 depicts in greater detail an architectural view for a multi-media center program that can provide access to multiple media-components via a central-user-interface in accordance with one embodiment of the invention.

FIG. 3 depicts in greater detail an architectural view for a multi-media center that allows users to access multiple media-components by interfacing with a central-user-interface in accordance with one embodiment of the invention. As shown in FIG. 3, in addition to a number of media-modules (304, 305, 306) and media-players 307, a module-controller 302 can communicate with a menu-window 308 and a User Interface Library (library) 310. It should be noted that the module-controller 302 can receive input (e.g., as events) from a keyboard and/or mouse 314, a remote device 316, or other hardware input 315 (e.g., DVD is inserted or ejected).

The menu-window 308 effectively controls menus displayed on the display 309. In addition, it can maintain and store menus using menu-views 312. The menu-views 312 effectively implements a stack of menu-views to keep track of what has been displayed on the display 309. Thus menu-views 312 can be added or removed from the stack as the user traverses up and down between various menus or submenus of a particular media-components or between main menu items of the multi-media center representing different media-components, and so on. As will be appreciated, menus and submenus can be created using a User Interface Library (library) 310. More particularly, when the module-controller 302 receives an input, for example, pertaining to a menu item associated with a particular media-component, the module-controller 302 can request that the media-module "post" the appropriate menu to make this request. The module-controller 302 can, for example, forward the input to a particular media-module. The media-module then, uses the User Interface Library (library) 310 to obtain an appropriate theme (or template) and then uses the theme from the User Interface Library (library) 310 to generate the appropriate menu (i.e., effectively fills out a template with its information). It should also be noted that a media-module 304 can also use a media access layer 320 to access data (e.g., list of songs, movies), for example, from a database associated with a media-component (iTunes) that stores information about the media-component. In any case, menus and/or other data generated and/or obtained by a media-module can be forwarded to the module-controller 302 which can in turn provide it to the menu-window 308.

To further elaborate, initialization of the module-controller 302 will be discussed now. Initially, an initial-event signifying the start of the multi-media center program is received. This initial-event can be input by a keyboard and/or mouse 314 or a remote device 316. In any case, in response to the initial-event, the module-controller 302 is initiated. The module-controller 302 effectively determines what media-modules are currently configured, as media-modules may be dynamically added or removed from the configuration (e.g., a media-module 306 may be added or removed without affecting other media-modules). In one embodiment of the invention, each media-module sends its initial data (icon and name) to the module-controller 302. The module-controller 302 sends the initial data (icons and names) to the menu-window 308 which generates a main menu including the initial data (icons and name) generated by the media-modules. The menu-window 308 can use the User Interface Library (library) 310 to generate the main menu for the multi-media center and facilitate displaying it on the display 309.

After the main menu for the multi-media center is generated and displayed, the module-controller 302 can wait for user input (i.e., input received from a user, for example, a human, or application program). If the input pertains to manipulation of the main menu for the multi-media center (e.g., rotation of a carrousel), then the module-controller 302 can forward it to the menu-window 308 which is capable of processing it to effectively manipulate the main menu displayed on display 309 for the multi-media center (e.g., rotate a carrousel that represents the main menu). If user input, however, pertains to a particular media-module (e.g., selection of a particular media-module from the main menu of the multi-media center), the menu-window 308 does not process it even if the module-controller 302 initially sends the input to the menu-window 308. Instead, the menu-window 308 can determine which media-module is to process the input. This determination can, for example, be made based on which menu or menu item is currently displayed or is effectively on top of the menu-views 312. The media-module associated with the menu can then be identified and forwarded to the module-controller 302.

Subsequently, the module-controller 302 can forward the user input to the appropriate media-module for processing. It is likely that the input associated with a media-module initially pertains to a main (or base) menu for the media-component represented by the media-module. The media-module can access the User Interface Library (library) 310 to get an appropriate theme (or template) for its base menu. In one embodiment, a set of menus including a standard menu and an accessorized menu are provided. The media-module can select a standard menu which includes a list of items, or an accessorized menu that additionally includes a preview screen. These Menus are also described in U.S. Provisional Patent Application No. 60/725,544, filed Oct. 10, 2005, and entitled "MULTIMEDIA CONTROL CENTER".

In any case, the media-module can obtain a template for a menu and subsequently fill (or populate) it with data (e.g., menu items). Subsequently the media-module can send its filled out menu to the module-controller 302 which can, in turn, send it to menu-window 308. The menu-window 308 effectively displays the menu by pushing it on the menu-views 312. In this way, a main (or base) menu for a particular media-component can be displayed in response to a selection made from the main menu of the multi-media center.

When user input pertains to the main menu of the multi-media center, it can be handled by the menu-window 308. More particularly, the input initially received by the module-controller 302 is forwarded to the menu-window 308. The menu-window 308 recognizes the input and it can effectively process the input and communicate it to the module-controller 302. However, the module-controller 302 may actually control the display, for example, by manipulating the main menu displayed for the multi-media center (e.g., rotates the main menu). However, if input pertains to a particular media-module (e.g., selection of a particular media-component), the input can be handled by the media-module. More particularly, the media-module can access the User Interface Library (library) 310 and construct another menu (or submenu) in a similar manner as discussed above. The constructed menu can then be sent to module-controller 302 which sends it to the menu-window 308.

It should be noted that in addition to generating a menu (or submenu), a media-module can effectively ask the module-controller 302 to initiate a media-player (307). More particularly, when a user selects, for example, a menu item that is associated with presenting media (e.g., play music, play film, show photo, slideshow), user input is received by the module-controller 302. The module-controller 302 can initially forward the input to the menu-window 308, but the menu-window 308 would not process the input as it does not pertain to manipulation of the main menu. Instead, the menu-window 308 effectively asks the module-controller 302 to forward the input to the appropriate media-module. In addition, the menu-window 308 can effectively identify the media-module that should process the input because it can determine which menu-view is the top (or most-front) menu and identify its associated media-module. In other words, menu-window 308 can determine which media-module's menu (or submenu) is currently being displayed and let the module-controller 302 know which media-module should process the input.

In addition to constructing menus, the media-module can perform other functions. By way of example, when user input associated with presentation of media is forwarded by the module-controller 302 to a media-module 304, the media-module 304 can identify the input as a request for presentation of media of its associated media-component. As a result, the media-module 304 identifies a media-player (307) to be initiated. Subsequently, the module-controller 302 initiates the media-player (307) which effectively results in presentation of media on display 309 and/or other devices (e.g., speakers). It should be noted that when a media-player is initiated, the media-module 304 does not directly communicate with the media-player. Furthermore, as long as the media-player is active (i.e., presenting media), the module-controller 302 sends input directly to the media-player (307) for processing. It will be appreciated that various media-players readily available and/or familiar to the users can be used. In addition, the familiar look and feel of media-players can be preserved. It is possible to have a media-player (e.g., music player) present media (e.g., music) in the background while another media-player presents media (e.g., displays photos or a slideshow). It should also be noted that it is possible to use a virtual stack (307) to keep track of usage of the media-players. Hence, when an active media-player terminates, the media-player is effectively popped from the virtual stack (307).

Figure 4A:
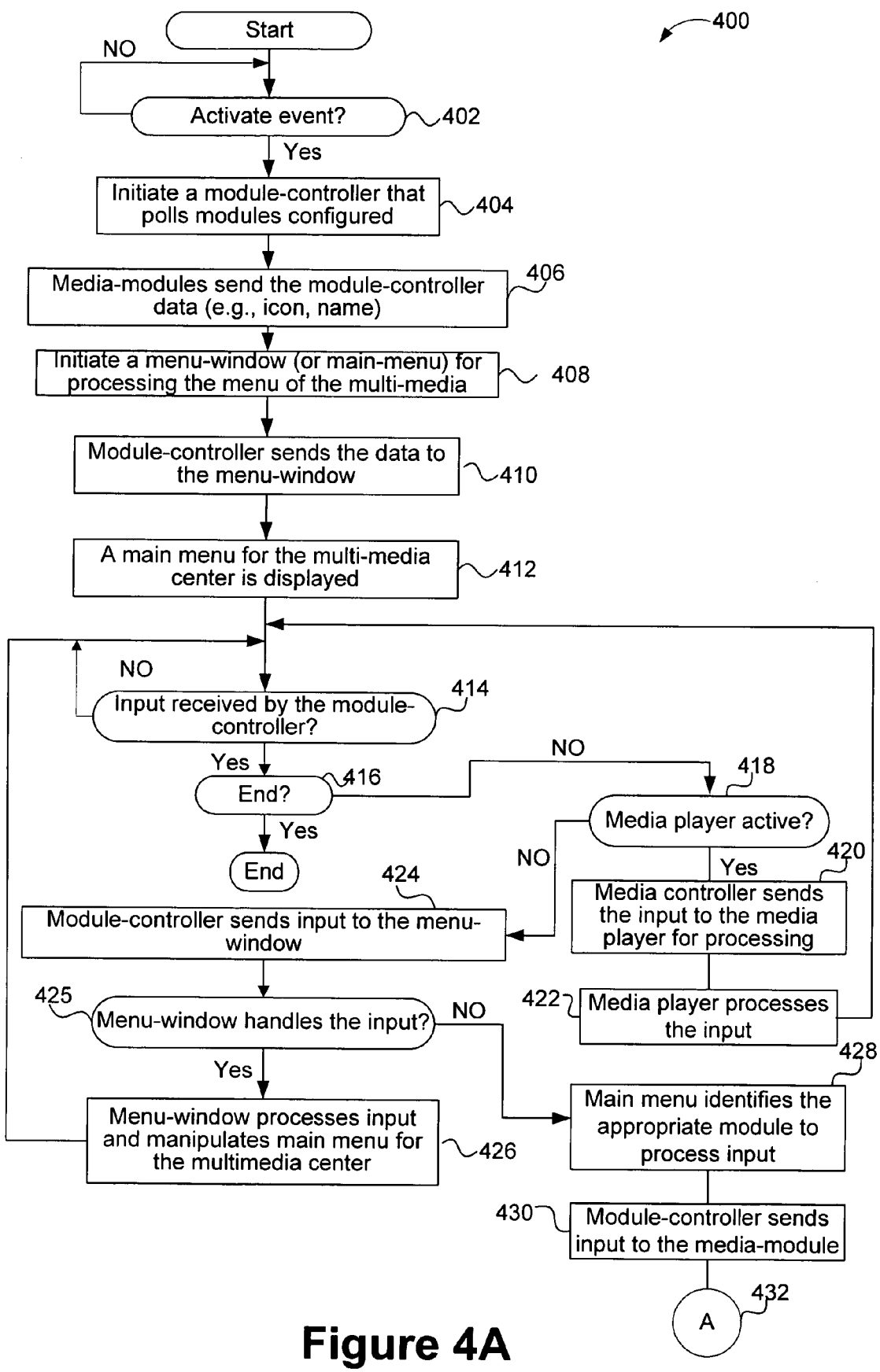
FIGS. 4A-4B depict a method for providing a multi-media center which can be accessed to a central-user-interface in accordance with another embodiment of the invention.
Figure 4B:
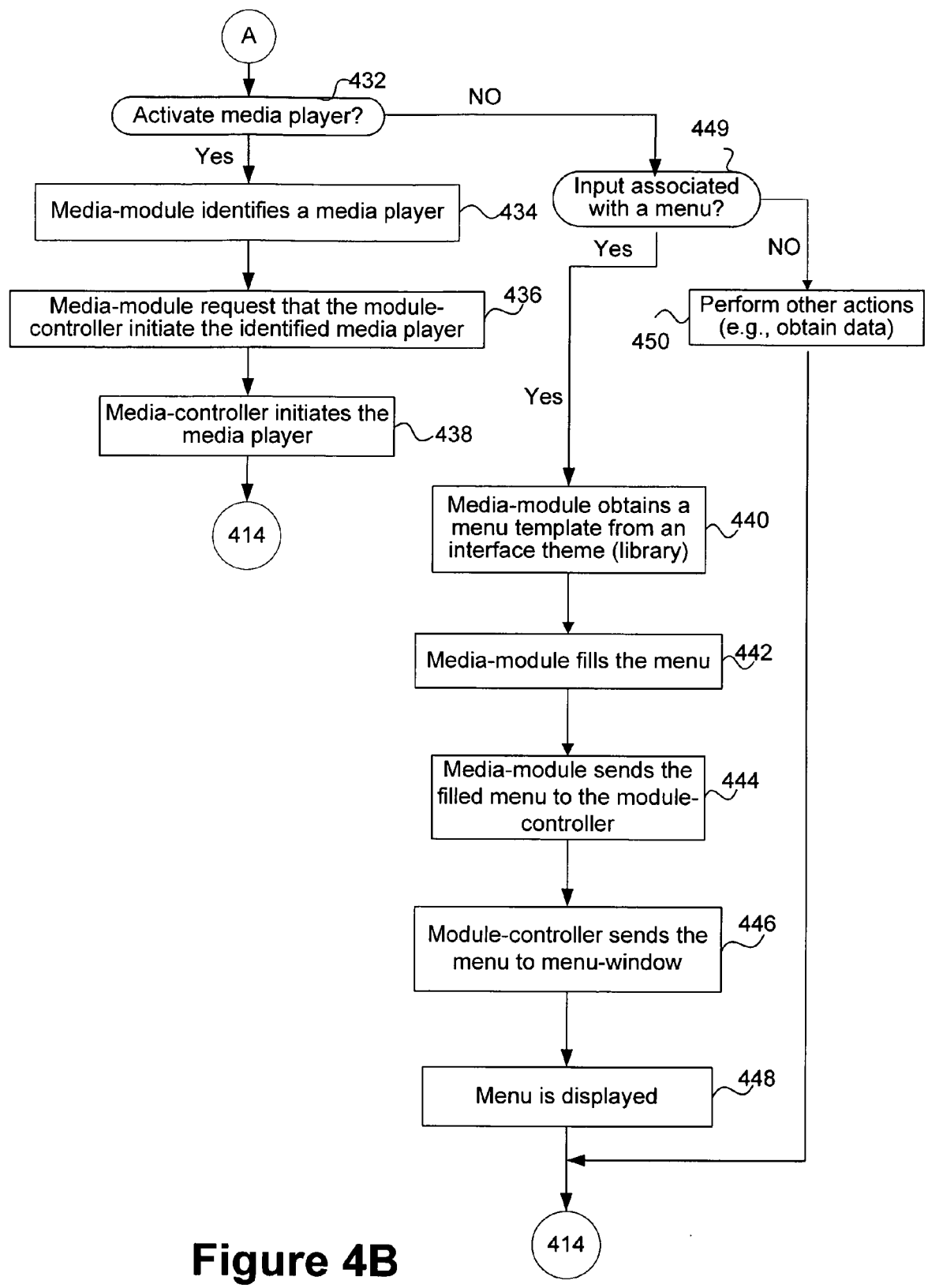

FIGS. 4A-4B depict a method 400 for providing a multi-media center which can be accessed via a central-user-interface in accordance with another embodiment of the invention. Initially, it is determined (402) whether an activation event is received. If it is determined (402) that an activation event is received, a module-controller is initiated (404). The module-controller effectively polls the media-modules which have been configured for the multi-media center for their initial data (e.g., name of the media-module and icon). Accordingly, the media-modules send (406) the module-controller initial data typically pertaining to their main menu for the multi-media center. As noted above, this data can, for example, include an icon and name for each of the media-modules. Thereafter, a menu window can be initiated (408). Subsequently, the module-controller sends (410) the menu window the initial data. Thereafter, the menu window displays (412) a main menu for the multi-media center 412. After the menu window is displayed, the module-controller effectively awaits (414) input. Assuming that the input does not indicate (416) to terminate the multi-media center, it is determined (418) whether a media-player is active. If it is determined (418) that a media-player is active, the module-controller sends (420) the input to the appropriate media-player for processing and the media-player processes (422) the input accordingly. Subsequently, it can be determined (414) by the module-controller whether input is received.

However, if it is determined (418) that a media-player is not active, the module-controller sends (424) the input to the menu window. The menu window can then determine (425) whether to handle the input. If the menu window determines (425) to handle the input, the menu window processes (426) the input. As a result, a main menu displayed for the multi-media center can be manipulated (426). Thereafter, the module-controller determines (414) whether input has been received and the method 400 proceeds in a similar manner as discussed above.

On the other hand, if it is determined (425) that the menu window cannot handle the input, the main window identifies (428) the appropriate media-module to process the input. Subsequently, the module-controller sends (430) the input to the identified media-module.

Next, referring to FIG. 4B, the media-module determines (432) whether to activate a media-player in response to the input. If it is determined (432) by the media-module to activate a media-player, the media-module identifies (434) a media-player and requests (436) from the module-controller to initiate the identified media-player. As a result, the module-controller initiates (438) the media-player. Thereafter, it can be determined (414) by the module-controller whether the input is received, and method 400 proceeds in the similar manner as discussed above.

On the other hand, if the media-module determines (432) not to activate a media-player, the input is directed to a menu (or other data) related to the media-component. Although other functions including obtaining (450) data can be performed by the media-module, for brevity, only construction of a menu is depicted in greater detail. Consequently, if it is determined (449) that the input is associated with a menu, the media-module obtains (440) a menu template from an User Interface Library (library). Subsequently, the media-module fills (442) the menu and sends (444) the filled menu to the module-controller. The module-controller sends (446) the menu to the menu-window. As a result, the appropriate menu is displayed (448) in response to the input received (414) by the media-controller. Thereafter, it is determined by the media-controller (414) whether the input is received, and the method 400 proceeds in the similar manner as discussed above until it is determined (416) to end the method 400 and effectively terminate the multi-media center.

Those skilled in the art will know that media-modules can be designed as computer program modules that can be "plugged" in or removed from a main multi-media center application program. As such, media-modules may post all requests through a module-controller. In addition, media-modules can use user interface classes and widgets provided in a user interface library, and access data via a media access layer. Media-modules can provide one or more of the following functions: provide a media-module identifier "key," provide a main (or base) menu, have the ability to respond to input corresponding to a selection of one of the items listed in their main (or base) menu, provide a name and/or icon image for the media-component they represent. The media-module may also provide other functions including saving or restoring states associated with a database, playing a sound, and phrase presentation of an associated media-player.

Those skilled in the art will also appreciate that a module-controller can function as traffic manager. It can instantiate and keep track of media-modules, route events associated with user input, control what is displayed. A user interface library can include metric utilities, windows and views, widgets, and sounds. The metric utilities can be implemented as a set of C programming calls that provide various layout metrics, including screen frames, the menu frames, and text attributes. Windows and views can include a collection of classes that define the layout and behavior of windows and views. Widgets can include a set of interface widgets that can be used by the media-module or window or views. Finally, the user interface library can also provide hooks to play sounds that can be played for various user actions. The sounds can be played via a standard C calls.

The invention has many advantages. An embodiment of the invention can include one or more of these advantages. One advantage of the invention is that various types of digital data and applications used to present digital data can be accessed from a user interface. Another advantage of the invention is that various types of digital data and applications can be added or removed dynamically. Yet another advantage of the invention is that it is possible to use a standard user interface library for various types of digital data and applications. Still another advantage of the invention is that it is possible to use and preserve the look and feel of more popular media-players.

The many features and advantages of the present invention are apparent from the written description, and thus, it is intended by the appended claims to cover all such features and advantages of the invention. Further, since numerous modifications and changes will readily occur to those skilled.

What is claimed is:

1. A method, implemented by a computing system, of providing a multi-media center that includes a plurality of media-components, said method comprising:
    configuring a plurality of media-modules for said multi-media center, wherein each of said plurality of media-modules represents a media-component in said multi-media-center, wherein each of said plurality of media-components includes: digital media and an application program to access digital media;
    initiating a module-controller that communicates directly with each of said plurality of media-modules;
    receiving by said module-controller an input associated with said multi-media center; and
    determining, by said module-controller, an output in response to said input, wherein the output is controlled by the module-controller,
    wherein at least one of said plurality of media-modules is identified to process and generate a response to said input received by said module-controller;
    wherein the plurality of media-modules are isolated from each other and do not directly communicate with each other, and wherein the plurality of media-modules are dynamically removed or added to the multi-media center.

2. A method as recited in claim 1, wherein said determining of said response, comprises:
    determining whether to forward said input to one of said plurality of media-modules.

3. A method as recited in claim 2, wherein said method further comprises:
    determining by a first media-module, a media-module-output for said input.

4. A method as recited in claim 3, wherein said media-module-output is sent by the first media-module to the module-controller.

5. A method as recited in claim 1, wherein said determining, by said module-controller, of a response to said input includes one or more of the following:
    determining whether to forward said input to one of said plurality of media-modules;
    determining whether to process said input by a media-player; and
    determining whether to forward said input to another module that is not one of said plurality of media-modules.

6. A method as recited in claim 5, further comprising:
    forwarding said input to a first media-player when said determining determines to process said input by a media-player; and
    forwarding said input to a main view when said determining determines to forward said input to another media-module.

7. A method, implemented by a computing system, of providing a multi-media center that includes a plurality of media-components which each includes digital data and an application program to access said digital data, said method comprising:
    determining, based on a plurality of media-modules that each respectively represent at least one media-component, a central-user-interface is used to access said plurality of media-components provided by said multi-media center;
    receiving input associated with said central-user-interface;
    determining whether to forward said input to one of said media-modules; and
    forwarding said input to a first media-module of said plurality of media-modules when said determining determines to forward said input by one of said media-modules,
    wherein said plurality of media-modules are isolated from each other and do not directly communicate with each other or with a multi-media center user, but communicate with a module-controller, and wherein the media-modules are dynamically removed or added to the multi-media center.

8. A method as recited in claim 7, wherein said method further comprises:
    determining which one of said media-modules is to receive said input when said determining determines to forward said input to one of said media-modules;
    generating, by said first media-component, a first output after associated with said input; and
    performing, based on said first output, at least a first operation in response to said input associated with said central-user-interface.

9. A method as recited in claim 8, wherein said first media-module includes or obtains data that is output by said first media-module as said first output.

10. A method as recited in claim 9,
    wherein said data pertains to a menu for the media-module,
    wherein said first output is said menu, and
    wherein said first operation is displaying said menu as a part of said central-user-interface.

11. A method as recited in claim 9,
    wherein said first media-module accesses a library to obtain a template for said menu; and
    wherein said first media-module fills said template with said data included in or obtained by said first module.

12. A method as recited in claim 8,
    wherein said output identifies a first media-player, and
    wherein said first operation initiates said first media-player.

13. A method as recited in claim 7, wherein said method further comprises:
    determining whether to process said input by a media-player capable of presenting media; and
    processing said input by a media-player when said determining determines to process said input by a media-player.

14. A method as recited in claim 7, wherein said determining of whether to process said input by a media-player is performed prior to said forwarding.

15. A method as recited in claim 7,
    wherein each one of said media-modules includes or obtains information that is used to generate a main menu for said media-modules, and wherein said central-user-interface includes each of said main menu for said media-modules.

16. A method as recited in claim 15,
wherein at least one of said media-modules includes or obtains information that is used to generate one or more submenus for said at least one media-module, and
wherein said central-user-interface includes said one or more submenus for said at least one media-module.

17. A method as recited in claim 16, wherein said information includes a number of menu or submenu items, icons, or streaming video.

18. A method as recited in claim 7, wherein said module-controller:
receives said input;
sends said input to said first media-module;
receives output from said first media-module in response to said input; and
performs at least one operation based on said output.

19. A method as recited in claim 18, wherein said at least one operation is one or more of the following:
initiate a media-player to present media; and
facilitate display of said output on a display.

20. A method as recited in claim 19,
wherein said module-controller sends said output to a menu-window for display,
wherein said module-controller forwards said input to a main window, and
wherein main window determines whether to process said input.

21. A method as recited in claim 20, wherein said method further comprises:
determining by said main window whether to process said input; and
determining by said main window a media-module to process said input when the main window determines not to process said input.

22. A computing system for providing a multi-media center that includes a plurality of media-components each including digital media, said computing system comprising:
at least one processor;
a plurality of media-modules each respectively represent at least one media-component provided by said multi-media center, wherein said media-modules include a first media-module that receives input and generate output; and
a module-controller that communicates directly with each of said plurality of media-modules, wherein said module-controller further operates to:
receive input associated with said multi-media center;
forward said input to a first media-module;
process and generate an output, by said first media-module, in response to said input;
receive said output from said first media-module in response to said input; and
perform at least one operation based on said output, wherein said at least one operation is controlled by the module-controller,
wherein said plurality of media-modules do not directly communicate with each other or with a multi-media center user and do not control said output, and wherein the plurality of medial-modules are dynamically removed or added to the multi-media center.

23. A computer readable medium including at least executable computer program modules stored therein for a multi-media center that includes a plurality of media-components, wherein each of said plurality of media-components includes digital data, said computer readable medium comprising:
configuring a plurality of media-modules for said multi-media center, wherein each of said plurality of media-modules represent a media-component in said multi-media-center;
computer program code for initiating a module-controller that communicates with plurality of media-modules for said multi-media center, wherein each of said plurality of media-modules represent a media-component in said multi-media-center;
computer program code for receiving, by said module-controller, an input associated with said multi-media center; and
computer program code for determining, by said module-controller, an output in response to said input, wherein the output is controlled by the module-controller, and
wherein at least one of the plurality of media-modules is identified to process and generate a response to said input received by said module-controller,
wherein the plurality of media-modules are isolated from each other and do not directly communicate with each other, and wherein the plurality of media-modules are dynamically removed or added to the multi-media center.

* * * * *

UNITED STATES PATENT AND TRADEMARK OFFICE
CERTIFICATE OF CORRECTION

| | | |
|---|---|---|
| PATENT NO. | : 7,721,208 B2 | |
| APPLICATION NO. | : 11/247975 | |
| DATED | : May 18, 2010 | |
| INVENTOR(S) | : Thomas Madden | |

It is certified that error appears in the above-identified patent and that said Letters Patent is hereby corrected as shown below:

On the title page in field (56), under "Other Publications", in column 2, line 1, delete "Microsft," and insert -- Microsoft, --, therefor.

On page 2, in column 2, under "Other Publications", line 10, delete "Sailing" and insert -- Salling --, therefor.

On page 2, in column 2, under "Other Publications", line 13, delete "dowloaded" and insert -- downloaded --, therefor.

On page 2, in column 2, under "Other Publications", line 18, delete "Relase," and insert -- Release, --, therefor.

On page 2, in column 2, under "Other Publications", line 21, delete "Manuar" and insert -- Manual --, therefor.

On Sheet 2 of 6, In Figure 2A, Reference Numeral 158, line 1, delete "controllers" and insert -- controls --, therefor.

In column 14, line 16, in Claim 22, delete "medial-modules" and insert -- media-modules --, therefor.

Signed and Sealed this
Twenty-ninth Day of November, 2011

David J. Kappos
*Director of the United States Patent and Trademark Office*